(12) United States Patent
Wu

(10) Patent No.: US 9,224,012 B2
(45) Date of Patent: Dec. 29, 2015

(54) DEBUG FUNCTIONALITY IN A SECURE COMPUTING ENVIRONMENT

(71) Applicant: Advanced Micro Devices, Inc., Sunnyvale, CA (US)

(72) Inventor: Winthrop J. Wu, Shrewsbury, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 297 days.

(21) Appl. No.: 13/897,688

(22) Filed: May 20, 2013

(65) Prior Publication Data

US 2014/0344919 A1    Nov. 20, 2014

(51) Int. Cl.
*G01R 31/28* (2006.01)
*G06F 21/74* (2013.01)

(52) U.S. Cl.
CPC ..................................... *G06F 21/74* (2013.01)

(58) Field of Classification Search
None
See application file for complete search history.

(56) References Cited

U.S. PATENT DOCUMENTS

| | | | |
|---|---|---|---|
| 2003/0204801 A1* | 10/2003 | Tkacik et al. | 714/726 |
| 2007/0150681 A1* | 6/2007 | Frank et al. | 711/163 |
| 2008/0148118 A1* | 6/2008 | Morgan et al. | 714/726 |
| 2009/0296933 A1* | 12/2009 | Akselrod et al. | 380/277 |
| 2009/0307546 A1* | 12/2009 | Dunn et al. | 714/726 |
| 2010/0263043 A1* | 10/2010 | Xu | 726/17 |
| 2011/0016326 A1* | 1/2011 | Craig et al. | 713/185 |
| 2011/0314514 A1* | 12/2011 | Goyal et al. | 726/2 |

* cited by examiner

*Primary Examiner* — April Y Blair
*Assistant Examiner* — Thien D Nguyen
(74) *Attorney, Agent, or Firm* — Park, Vaughan, Fleming & Dowler LLP

(57) ABSTRACT

A computer system includes a security processor, a first scan chain coupled to the security processor, a non-secure element, and a second scan chain coupled to the non-secure element. The computer system also includes one or more test access port controllers to control operation of the first and second scan chains, and further includes debug control logic, coupled to the one or more test access port controllers, to enable the one or more test access port controllers to activate debug functionality on the second scan chain but not the first scan chain in response to a predefined condition being satisfied.

19 Claims, 4 Drawing Sheets

400

In a computer system that includes a security processor coupled to a first scan chain and a non-secure element coupled to a second scan chain: (402)

In response to a reset event, deactivate debug functionality on the first and second scan chains. (404)

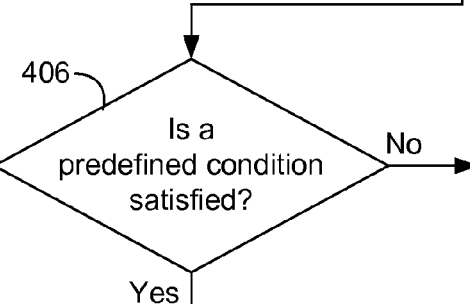

406 — Is a predefined condition satisfied?

No → Leave the debug functionality on the first and second scan chains deactivated. (408)

Provide boundary scan functionality on the first and second scan chains. (410)

Yes

Activate the debug functionality on the second scan chain. Leave the debug functionality on the first scan chain deactivated. (412)

Provide boundary scan functionality on the first and second scan chains. (414)

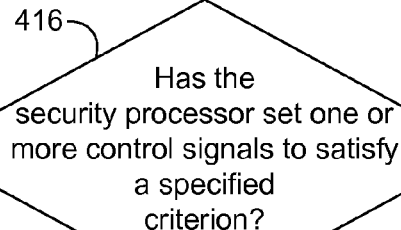

416 — Has the security processor set one or more control signals to satisfy a specified criterion?

No → Leave the debug functionality on the first scan chain deactivated. (418)

Yes

Activate the debug functionality on the first scan chain. (420)

FIG. 4

DEBUG FUNCTIONALITY IN A SECURE COMPUTING ENVIRONMENT

TECHNICAL FIELD

The present embodiments relate generally to performing debugging in computer systems, and more specifically to performing debugging in a computer system that includes a security processor.

BACKGROUND

A tension exists between ensuring security in a computer system and providing access to elements of the computer system for debugging. To ensure security, it is desirable to prevent access to elements of the computer system. Preventing access to elements of the computer system, however, makes it difficult or impossible to debug the computer system when the computer system fails.

SUMMARY

Embodiments are disclosed in which an available level of debug functionality varies in accordance with the security state of a computer system.

In some embodiments, a computer system includes a security processor, a first scan chain coupled to the security processor, a non-secure element, and a second scan chain coupled to the non-secure element. The computer system also includes one or more test access port controllers to control operation of the first and second scan chains, and further includes debug control logic, coupled to the one or more test access port controllers, to enable the one or more test access port controllers to activate debug functionality on the second scan chain but not the first scan chain in response to a predefined condition being satisfied.

In some embodiments, a computer system includes a security processor coupled to a first scan chain and a non-secure element coupled to a second scan chain. Debug functionality is deactivated on the first and second scan chains in response to a reset event. After the reset event, the debug functionality is activated on the second scan chain in response to a predefined condition being satisfied. Debug functionality on the first scan chain is left deactivated in response to the predefined condition being satisfied.

BRIEF DESCRIPTION OF THE DRAWINGS

The present embodiments are illustrated by way of example and are not intended to be limited by the figures of the accompanying drawings.

FIG. 4 is a flowchart showing a method of activating debug functionality in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
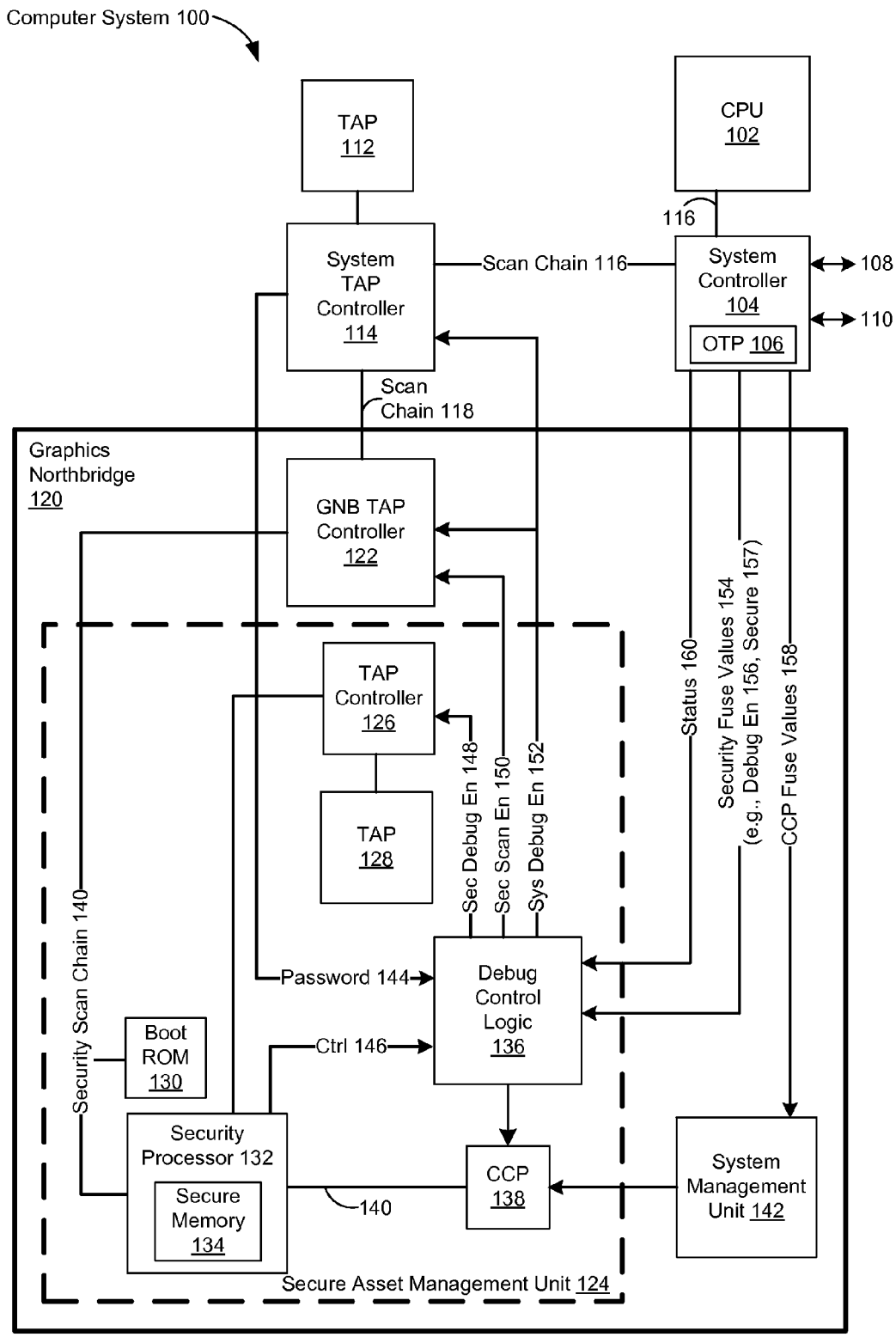
FIG. 1 is a block diagram of a portion of a computer system in accordance with some embodiments.

FIG. 1 is a block diagram of a portion of a computer system 100 in accordance with some embodiments. The computer system 100 includes a central processing unit (CPU) 102 that includes one or more processor cores and may include one or more levels of cache memory. The CPU 102 is coupled to a system controller 104 that controls communication between the CPU 102 and the remainder of the computer system 100. The system controller 104 includes memory interfaces 108 to connect with main memory and/or one or more levels of cache memory (not shown) and input/output (I/O) interfaces 110 to connect with external devices (not shown). For example, the system controller 104 provides the functionality of both a Northbridge and a Southbridge. The system controller 104 also may control power supplies and clocking. In some embodiments, the system controller 104 is a unified Northbridge that controls memory access as well as I/O access, power supplies, and clocking.

The system controller 104 includes one-time-programmable (OTP) circuitry 106 in which various values are stored using fuses (e.g., electronically programmable fuses, referred to as eFuses). For example, these values are programmed into the OTP circuitry 106 during manufacturing. Some of the values stored in the OTP circuitry 106 may be used in determining a security state of the computer system 100. Other values stored in the OTP circuitry 106 may be used for cryptographic processing. An example of the OTP circuitry 106 is described below with respect to FIG. 2A.

While the computer system 100 is shown with a single system controller 104 that includes both memory interfaces 108 and I/O interfaces 110, the computer system 100 may alternatively include separate memory and I/O controllers (e.g., a separate Northbridge and Southbridge).

The system controller 104 is coupled to a graphics Northbridge (GNB) 120, which controls communications with a graphics processing unit (GPU) in the computer system 100. (The GPU is not shown in FIG. 1 for simplicity but is coupled to the GNB 120). The GNB 120 includes a system management unit 142 coupled to the system controller 104 and also includes a secure asset management unit 124. The secure asset management unit 124 includes various secure assets, which are also referred to as secure elements; these secure elements include a security processor 132, a secure memory 134, a boot read-only memory (boot ROM) 130, and a cryptographic co-processor (CCP) 138. (The secure memory 134 is coupled to the security processor 132. While it is shown within the security processor 132, it may alternatively be external to the security processor 132 within the secure asset management unit 124.) The secure asset management unit 124 also includes debug control logic 136 to determine the degree of access allowed for various elements of the computer system 100. Elements of the computer system 100 outside of the secure asset management unit 124 may be referred to as non-secure elements, in contrast to the secure elements of the secure asset management unit 124. Examples of non-secure elements include, but are not limited to, the system controller 104, the CPU 102, and the GPU (not shown). In some embodiments, the degree of access allowed for non-secure elements differs from the degree of access allowed for secure elements. However, the degree of access allowed for non-secure elements may still vary depending on the security state of the computer system 100.

In some embodiments, the portion of the computer system 100 shown in FIG. 1 is implemented as a system-on-a-chip (SOC): the circuitry of FIG. 1 is implemented in a single integrated circuit on a single semiconductor die (i.e., chip). In some other embodiments, all elements shown in FIG. 1 except for the CPU 102 are implemented as an SOC, while the CPU 102 is implemented on a separate chip. These arrangements are merely examples; other arrangements are possible.

The computer system 100 includes test access ports (TAPs), TAP controllers, and associated scan chains that may be used to perform boundary scan testing and debugging of the computer system 100. For example, a system-level TAP controller 114 (e.g., an SOC TAP controller) is coupled to a TAP 112 and a scan chain 116. In the example of FIG. 1, the scan chain 116 connects to the system controller 104 and the CPU 102. The system-level TAP controller 114 thus controls access to the system controller 104 and the CPU 102 through the scan chain 116 (e.g., via the TAP 112). A GNB TAP controller 122 in the GNB 120 is coupled to and controls access to a security scan chain 140, which connects to the boot ROM 130, security processor 132, secure memory 134, and cryptographic co-processor 138. The security scan chain 140 thus provides access to various secure elements in the secure asset management unit 124. A scan chain 118 couples the GNB TAP controller 122 to the system-level TAP controller 114, such that the security scan chain 140 is ultimately accessible through the TAP 112. (Alternatively, or in addition, the GNB TAP controller 122 may have a dedicated test access port, which is not shown in FIG. 1). In some embodiments, the scan chains 116, 118, and 140 are different levels of a global scan chain (e.g., with a hierarchical configuration) in the computer system 100.

The secure asset management unit 124 includes a TAP 128 and associated TAP controller 126 that may be used to access the security processor 132 (e.g., to provide direct access to the security processor 132).

In some embodiments, the TAPs 112 and 128, TAP controllers 114, 122, and 126, and scan chains 116, 118, and 140 are implemented in accordance with a Joint Test Action Group (JTAG) architecture, as standardized in the IEEE 1149 standards. For example, the TAPs 112 and 128 are JTAG ports that provide external access for testing and/or debugging the computer system 100 using JTAG.

Other TAP controller arrangements besides the arrangement shown in FIG. 1 are possible. For example, the system-level TAP controller 114 and GNB TAP controller 122 may be combined into a single TAP controller. Also, the TAP controller 126 (and associated test access port 128) may be omitted in accordance with some embodiments.

The debug control logic 136 generates enable signals and provides them to respective TAP controllers. The enable signals specify the degree of access that the TAP controllers allow to elements to which the TAP controllers are coupled (e.g., through respective scan chains). In some embodiments, a secure debug enable (Sec Debug En) signal 148 is provided to the TAP controller 126, a secure scan enable (Sec Scan En) signal 150 is provided to the GNB TAP controller 122, and a system-level debug enable (Sys Debug En) signal 152 is provided to the GNB TAP controller 122 and the system-level TAP controller 114. The system-level debug enable signal 152 may be an SOC-level debug enable signal in accordance with some embodiments. The debug control logic 136 generates the secure debug enable signal 148, secure scan enable signal 150, and system-level debug enable signal 152 in accordance with a security state of the computer system 100, as determined based on one or more signals provided to the debug control logic 136. For example, the security state is determined based on security fuse values 154 (e.g., including a debug-enable signal 156 and a secure signal 157) from the OTP circuitry 106, a status flag 160 from the OTP circuitry 106, a debug password 144 (e.g., as received through the test access port 112 and forwarded by the system-level TAP controller 114), and/or one or more control (Ctrl) signals 146 from the security processor 132. In some embodiments, the debug password 144 can only be provided once per power cycle. Examples of the logic used to generate the secure debug enable signal 148, secure scan enable signal 150, and system-level debug enable signal 152 are provided below with respect to FIG. 2B.

In some embodiments, the system-level TAP controller 114 activates debug functionality on the scan chain 116 in response to assertion of the system-level debug enable signal 152. In some embodiments, the GNB TAP controller 122 activates debug functionality on the security scan chain 140 in response to assertion of both the secure scan enable signal 150 and system-level debug enable signal 152 (e.g., in response to assertion of the system-level debug enable signal 152 followed by assertion of the secure scan enable signal 150). Alternatively, the system-level debug enable signal 152 is not provided to the GNB TAP controller 122, which activates debug functionality on the security scan chain 140 in response to assertion of the secure scan enable signal 150. In some embodiments, the TAP controller 126 activates debug functionality through its connection with the security processor 132 in response to assertion of the secure debug enable signal 148. A respective signal is said to be asserted when it has a first predefined value (e.g., '1', or alternately '0') and de-asserted when it has a second predefined value (e.g., '0', or alternately '1').

The logical requirements for assertion of the secure scan enable signal 150 may be stricter than the logical requirements for assertion of the system-level debug enable signal 152. As a result, debug functionality may be activated on the scan chain 116 but not the security scan chain 140 in a particular security state.

Examples of debug functionality include, but are not limited to, the ability to stop clocks, scan registers, write to registers, change configurations, probe memories, and perform interrupts. The GNB TAP controller 122 therefore may allow any or all of these functions to be performed through the security scan chain 140 on respective secure elements in the secure asset management unit 124 (e.g., in response to assertion of the secure scan enable signal 150, or assertion of both the secure scan enable signal 150 and system-level debug enable signal 152). The system-level TAP controller 114 may allow any or all of these functions to be performed through the scan chain 116 on non-secure elements outside of the secure asset management unit 124 (e.g., in response to assertion of the system-level debug enable signal 152). The TAP controller 126 may allow any or all of these functions to be performed on the security processor 132 (e.g., in response to assertion of the secure debug enable signal 148).

In some embodiments, the system-level TAP controller 114 and/or GNB TAP controller 122 allow boundary scan functionality (e.g., for pass/fail boundary scan testing) on the scan chain 116 and security scan chain 140, respectively, regardless of whether debug functionality is activated (e.g., regardless of the values of the secure scan enable signal 150 and/or system-level debug enable signal 152). For example, boundary scan functionality is available after a reset event regardless of the security state of the computer system 100, while the availability of debug functionality is a function of the security state of the computer system 100.

Figure 2A:
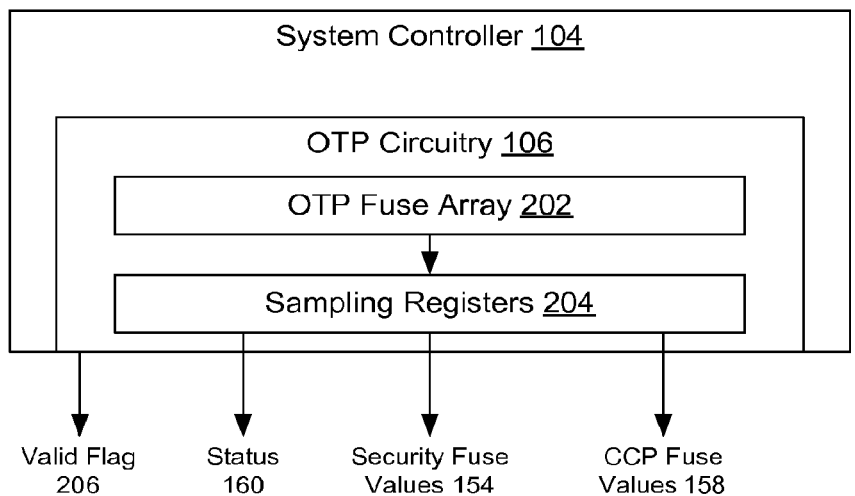
FIG. 2A is a block diagram showing one-time programmable circuitry in a system controller of the computer system of FIG. 1 in accordance with some embodiments.

FIG. 2A is a block diagram showing the OTP circuitry 106 in the system controller 104 of the computer system 100 (FIG. 1) in accordance with some embodiments. The OTP circuitry 106 includes an OTP fuse array 202 (e.g., an array of eFuses), which are programmed once (e.g., during manufacturing). The values stored in the fuse array 202 are read (e.g., during boot) and stored in the sampling registers 204, from where they may be provided to other elements of the computer system 100. The values stored in the fuse array 202 and made available through the sampling registers 204 may include a status flag 160, security fuse values 154, and CCP fuse values 158. The status flag 160 may indicate whether the computer system 100 has a first status (e.g., a bring-up status) in which security is relaxed to allow debugging or a second status in which security is tightened to prevent debugging during normal operation. For example, the status flag 160 indicates the first status when asserted and the second status when de-asserted. The security fuse values 154 may include a debug enable bit that corresponds to the debug enable signal 156 (FIG. 1) and a secure bit that corresponds to the secure signal 157 (FIG. 1). The CCP values 154 may include a chip identifier and cryptographic keys. The OTP circuitry 106 may also provide a valid flag 206 to indicate that the OTP circuitry 106 has powered up properly and the values in the fuse array 202 are available from the sampling registers 204. The valid flag is provided, for example, to the debug control logic 136 (FIG. 1).

Figure 2B:
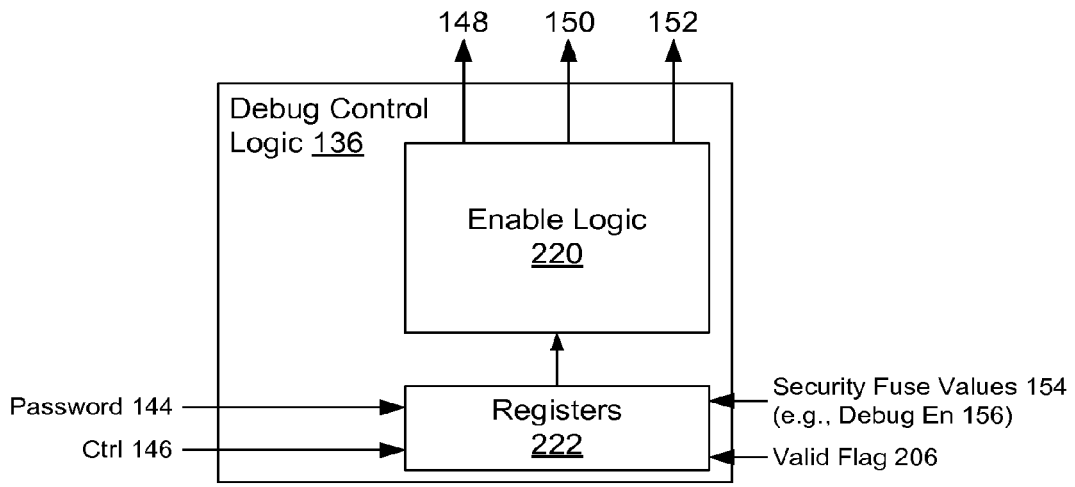
FIG. 2B is a block diagram of debug control logic in the computer system of FIG. 1 in accordance with some embodiments.

FIG. 2B is a block diagram of the debug control logic 136 (FIG. 1) in accordance with some embodiments. Registers 222 in the debug control logic 136 receive and store the debug password 144 (or an indication that a valid debug password 144 was received), one or more control signals 146, security fuse values 154 (e.g., including the debug-enable signal 156 and secure signal 157), and/or valid flag 206. The registers 222 provide these values to enable logic 220, which generates the secure debug enable signal 148, secure scan enable signal 150, and system-level debug enable signal 152. (Alternatively, one or more of these values may be provided directly to the enable logic 220 instead of being stored in the registers 222).

In some embodiments, the enable logic 220 asserts the secure debug enable signal 148 if the valid flag 206 is asserted and one or more of the following criteria are satisfied: the status flag 160 is asserted, or the one or more control signals 146 from the security processor 132 satisfy a specified criterion. In Boolean logic, the secure debug enable signal 148 is thus asserted if: (the valid flag 206 is asserted) AND [(the status flag 160 is asserted) OR (the one or more control signals 146 satisfy a specified criterion)]. Otherwise, the secure debug enable signal 148 is de-asserted. In one example, the specified criterion is that one of the one or more control signals 146 is asserted. In another example, the specified criterion is that a first one of the one or more control signals 146 is asserted and a second one of the one or more control signals 146 is de-asserted.

In some embodiments, the enable logic 220 asserts the secure scan enable signal 150 if the valid flag 206 is asserted and one or more of the following criteria are satisfied: the status flag 160 is asserted, the secure signal 157 is asserted, or the one or more control signals 146 from the security processor 132 satisfy a specified criterion (e.g., the same criterion specified for the debug enable signal 148). In Boolean logic, the secure scan enable signal 150 is thus asserted if: (the valid flag 206 is asserted) AND [(the status flag 160 is asserted) OR (the secure signal 157 is asserted) OR (the one or more control signals 146 satisfy a specified criterion)]. Otherwise, the secure scan enable signal 150 is de-asserted.

In some embodiments, the enable logic 220 asserts the system-level debug enable signal 152 if the valid flag 206 is asserted and one or more of the following criteria are satisfied: the status flag 160 is asserted, the secure signal 157 is asserted, the one or more control signals 146 from the security processor 132 satisfy a specified criterion, or the debug enable signal 156 is asserted and a valid debug password 144 is received. In Boolean logic, the system-level debug enable signal 152 is thus asserted if: (the valid flag 206 is asserted) AND [(the status flag 160 is asserted) OR (the secure signal 157 is asserted) OR (the one or more control signals 146 satisfy a specified criterion) OR (the debug enable signal 156 is asserted AND a valid debug password 144 is received)]. Otherwise, the system-level debug enable signal 152 is de-asserted. In some embodiments, the specified criterion is different than the specified criterion for the secure debug enable signal 148 and secure scan enable signal 150. For example, the specified criterion may include assertion of a different one of the one or more control signals 146.

The logic for asserting the secure scan enable signal 150 is thus more stringent than the logic for asserting the system-level debug enable signal 152, in accordance with some embodiments. The system-level debug enable signal 152 may be asserted in response to receipt of a valid password 144 and assertion of the debug enable signal 156 (e.g., assuming the valid flag 206 is asserted), while the secure scan enable signal 150 is not asserted under this condition.

FIGS. 1 and 2B show the debug control logic 136 as a single element of the computer system 100. In some embodiments, however, all or a portion of the debug control logic 136 is distributed among the TAP controllers 114, 122, and/or 126. For example, each of the TAP controllers 114, 122, and 126 may have associated with it respective logic to generate a respective enable signal.

Figure 2C:
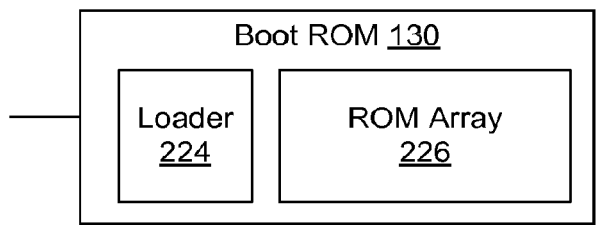
FIG. 2C is a block diagram of a boot ROM in the computer system of FIG. 1 in accordance with some embodiments.

FIG. 2C is a block diagram of the boot ROM 130 in accordance with some embodiments. The boot ROM 130 includes a ROM array 226 that stores code (e.g., a kernel) to be run on the security processor 132. The boot ROM 130 also includes a loader 224 to load code into the security processor 132. In some embodiments, the loader 224 may selectively load code from the ROM array 226 or from an external interface (e.g., the TAP 128 or a separate interface, such as an $I^2C$ interface) into the security processor 132.

Figure 3:
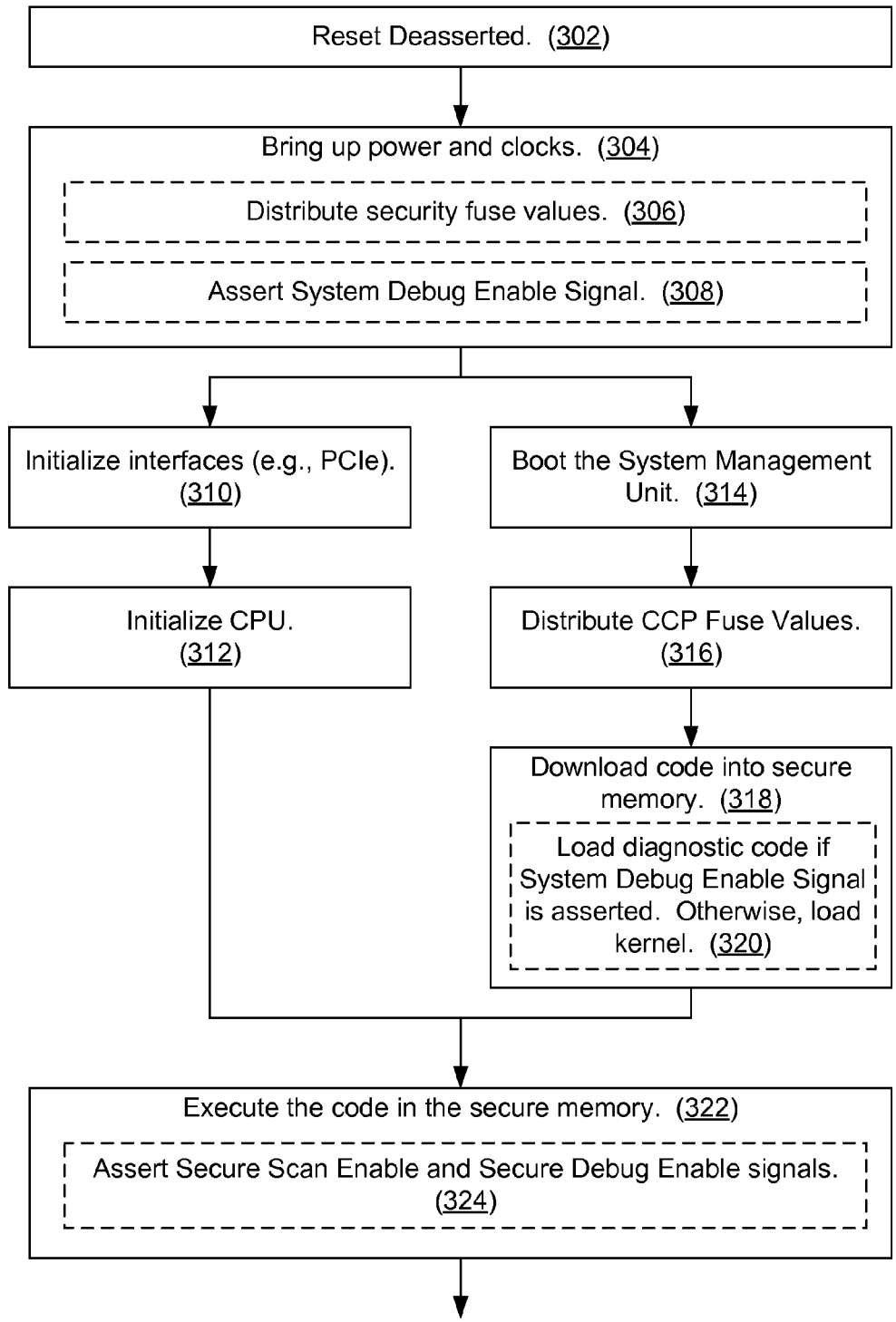
FIG. 3 is a flowchart showing a boot flow in accordance with some embodiments.

FIG. 3 is a flowchart showing a boot flow 300 to be performed in a computer system such as the computer system 100 in accordance with some embodiments. In the boot flow 300, reset is de-asserted (302). Power and clocks are brought up (304) (e.g., under the control of the system controller 104, FIG. 1). In some embodiments, the security fuse values 154 are distributed (306) to the debug control logic 136 at this time. Once the security fuse values 154 are distributed to the debug control logic 136, the system-level debug enable signal 152 may be asserted (308). For example, the system-level debug enable signal 152 is asserted if the valid flag 206 is asserted, the debug enable signal 156 is asserted, and a valid debug password 144 has been received.

The boot flow branches. In a first branch, interfaces (e.g., I/O interfaces 110) are initialized (310). In some embodiments, the initialized interfaces include one or more Peripheral Component Interconnect Express (PCIe) interfaces. The CPU 102 is initialized (312).

In a second branch, the system management unit 142 boots up (314). Once the system management unit 142 has booted, CCP fuse values 158 are distributed (316). The system management unit 142 fetches the CCP fuse values 158 from the OTP circuitry 106 (e.g., from the sampling registers 204, FIG. 2A) and provides them to the cryptographic co-processor 138.

Code is downloaded (318) into the secure memory 134. In some embodiments, the code that is downloaded depends on whether the system-level debug enable signal 152 is asserted. If the system-level debug enable signal 152 is asserted, diagnostic code is loaded into the secure memory 134. For example, the loader 224 (FIG. 2C) loads the diagnostic code into the secure memory 134 from an external interface. If the system-level debug enable signal 152 is not asserted, a kernel (e.g., as stored in the ROM array 226, FIG. 2C) is loaded into the secure memory 134.

The security processor 132 executes (322) the code stored in the secure memory 134. In some embodiments, the secure debug enable signal 148 and secure scan enable signal 150 are asserted in response. For example, the security processor 132 sets the one or more control signals 146 to values that satisfy a specified criterion, thus enabling the debug control logic 136 to assert the secure debug enable signal 148 and secure scan enable signal 150 (e.g., as described with respect to FIG. 2B.)

The boot flow may include additional initialization operations, which are not shown for simplicity.

FIG. 4 is a flowchart showing a method 400 of activating debug functionality in accordance with some embodiments. The method 400 is performed in a computer system (e.g., the computer system 100, FIG. 1) that includes (402) a security processor 132 coupled to a first scan chain (e.g., the security scan chain 140, FIG. 1) and also includes one or more non-secure elements (e.g., the system controller 104 and/or CPU 102, FIG. 1) coupled to a second scan chain (e.g., the scan chain 116, FIG. 1).

In response to a reset event, debug functionality is deactivated (404) on the first and second scan chains. For example, the secure scan enable signal 150 and system-level debug enable signal 152 are both de-asserted. Because these signals are de-asserted, the system-level TAP controller 114 and GNB TAP controller 122 do not allow debug functionality on the scan chain 116 and security scan chain 140, respectively.

A determination is made (406) as to whether a predefined condition is satisfied. In some embodiments, the predefined condition includes a valid debug password 144 having been received and the debug enable signal 156 being asserted (e.g., as described with respect to the enable logic 220, FIG. 2B).

If the predefined condition is not satisfied (406—No), debug functionality is left deactivated (408) on the first and second scan chains. For example, the secure scan enable signal 150 and system-level debug enable signal 152 remain de-asserted. In some embodiments, however, boundary scan functionality (e.g., for pass/fail testing) is provided (410) on the first and second scan chains.

If the predefined condition is satisfied (406—Yes), debug functionality is activated (412) on the second scan chain but left deactivated on the first scan chain. For example, the debug control logic 136 (e.g., the enable logic 220, FIG. 2B) asserts the system-level debug enable signal 152 but not the secure scan enable signal 150. As a result, the system-level TAP controller 114 activates debug functionality on the scan chain 116, but the GNB TAP controller 122 does not activate debug functionality on the security scan chain 140. In some embodiments, however, boundary scan functionality (e.g., for pass/fail testing) is provided (414) on both the first and second scan chains.

In some embodiments, debug functionality is activated (412) on the second scan chain in response to operation 308 of the method 300 (FIG. 3).

A determination is made (416) as to whether the security processor 132 has set one or more control signals 146 to satisfy a specified criterion. For example, the enable logic 220 in the debug control logic 136 makes this determination, as described with respect to FIG. 2B.

If the security processor 132 has not set the one or more control signals 146 to satisfy the specified criterion (416—No), debug functionality is left deactivated (418) on the first scan chain. For example, the secure scan enable signal 150 remains de-asserted.

If, however, the security processor 132 has set the one or more control signals 146 to satisfy the specified criterion (416—Yes), debug functionality is activated (420) on the first scan chain. For example, the debug control logic 136 (e.g., the enable logic 220, FIG. 2B) asserts the secure scan enable signal 150. As a result, the GNB TAP controller 122 activates debug functionality on the security scan chain 140. Debug functionality is thus activated on the first scan chain in response to a combination of the predefined condition being satisfied (406—Yes) and the one or more control signals 146 satisfying the specified criterion (416—Yes).

In some embodiments, debug functionality is activated (420) on the first scan chain in response to operation 324 of the method 300 (FIG. 3).

In some embodiments, activating debug functionality on the first scan chain includes making one or more secure elements in the secure asset management unit 124 (FIG. 1) accessible. For example, the boot ROM 130, security processor 132, secure memory 134, and/or cryptographic co-processor 138 are made accessible through the security scan chain 140.

In some embodiments, the security processor 132 deletes data from the secure memory 134 before setting the one or more debug control signals to satisfy the specified criterion. Data is thus deleted from the secure memory 134 before debug functionality is activated on the first scan chain (e.g., the security scan chain 140), to prevent the data from being accessed during debugging.

The available level of debug functionality thus varies in the method 400 in accordance with the security state of the computer system. The method 400 maintains security while providing access for debugging.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:
1. A computer system, comprising:
a security processor;
a first scan chain coupled to the security processor;
a non-secure element;
a second scan chain coupled to the non-secure element;

one or more test access port controllers that control operation of the first scan chain and the second scan chain; and debug control logic coupled to the one or more test access port controllers, the debug control logic:

enabling the one or more test access port controllers to activate debug functionality on the second scan chain but not the first scan chain when a predefined condition is satisfied and one or more control signals from the security processor do not satisfy a specified criterion, the predefined condition being that a debug-enable signal is asserted and a debug password has been received; and enabling the one or more test access port controllers to activate debug functionality on the first scan chain when the predefined condition is satisfied and the one or more control signals from the security processor satisfy the specified criterion.

2. The computer system of claim 1, wherein the one or more test access port controllers are to provide boundary scan functionality on the first scan chain and the second scan chain regardless of whether the predefined condition is satisfied.

3. The computer system of claim 1, further comprising:
one-time-programmable circuitry to provide the debug-enable signal; and
a port to receive the debug password.

4. The computer system of claim 3, wherein the one-time-programmable circuitry comprises an electronically programmable fuse to store a bit corresponding to the debug-enable signal.

5. The computer system of claim 1, further comprising:
a secure memory coupled to the first scan chain;
wherein the security processor deletes data from the secure memory before setting the one or more control signals to satisfy the specified criterion.

6. The computer system of claim 1, wherein the one or more test access port controllers comprise:
a first test access port controller coupled to the first scan chain, the first test access port controller controlling operation of the first scan chain, wherein enabling the one or more test access port controllers to activate debug functionality on the first scan chain comprises enabling the first test access port controller; and
a second test access port controller coupled to the second scan chain, the second test access port controller controlling operation of the second scan chain, wherein enabling the one or more test access port controllers to activate debug functionality on the second scan chain comprises enabling the second test access port controller.

7. The computer system of claim 1, further comprising:
a boot read-only memory (ROM) and a cryptographic coprocessor, both coupled to the security processor and the first scan chain;
wherein the security processor, the boot ROM, and the cryptographic coprocessor are accessible through the first scan chain in response to activation of the debug functionality on the first scan chain.

8. The computer system of claim 6, further comprising:
a third test access port controller coupled to the security processor;
wherein the debug control logic enables the third test access port controller to access the security processor when the predefined condition is satisfied and one or more control signals from the security processor satisfy another specified criterion.

9. The computer system of claim 1, wherein the debug functionality comprises the ability to perform one or more functions selected from the group consisting of stopping clocks, scanning registers, writing to registers, changing configurations, probing memories, and performing interrupts.

10. The computer system of claim 1, wherein the security processor:
executes diagnostic code; and
configures the one or more control signals based on executing the diagnostic code.

11. A method, comprising:
in a computer system comprising a security processor coupled to a first scan chain and a non-secure element coupled to a second scan chain:
based on encountering a reset event, deactivating debug functionality on the first scan chain and the second scan chain;
activating debug functionality on the second scan chain but not the first scan chain when a predefined condition is satisfied and one or more control signals from the security processor do not satisfy a specified criterion, the predefined condition being that a debug-enable signal is asserted and a debug password has been received; and
activating debug functionality on the first scan chain when the predefined condition is satisfied and the one or more control signals from the security processor satisfy the specified criterion.

12. The method of claim 11, further comprising providing boundary scan functionality on the first scan chain and the second scan chain regardless of whether the predefined condition is satisfied.

13. The method of claim 11, wherein:
the computer system further comprises one-time-programmable circuitry that provides the debug-enable signal; and
the method further comprises determining that the predefined condition is satisfied, the determining comprising:
detecting that the debug-enable signal from the one-time-programmable circuitry is asserted, and
receiving the debug password.

14. The method of claim 11, further comprising:
in the security processor, setting one or more control signals to satisfy the specified criterion.

15. The method of claim 11, wherein:
the computer system further comprises a boot read-only memory (ROM) and a cryptographic coprocessor, both coupled to the security processor and the first scan chain; and
activating the debug functionality on the first scan chain comprises making the security processor, the boot ROM, and the cryptographic coprocessor accessible through the first scan chain.

16. The method of claim 11, wherein the computer system further comprises a secure memory coupled to the first scan chain, the method further comprising deleting data from the secure memory before setting the one or more control signals to satisfy the specified criterion.

17. The method of claim 11, wherein:
the computer system further comprises a first test access port controller coupled to the first scan chain and a second test access port controller coupled to the second scan chain; and
wherein activating the debug functionality on the first scan chain comprises providing an asserted first enable signal to the first test access port controller and activating the debug functionality on the second scan chain comprises providing an asserted second enable signal to the second test access port controller.

18. A computer system, comprising:
a security processor;
a first scan chain coupled to the security processor;
a non-secure element;
a second scan chain coupled to the non-secure element;
means for controlling access to the security processor through the first scan chain and for controlling access to the non-secure element through the second scan chain; and
means for activating debug functionality on the second scan chain but not the first scan chain when a predefined condition is satisfied and one or more control signals from the security processor do not satisfy a specified criterion, the predefined condition being that a debug-enable signal is asserted and a debug password has been received; and
means for activating debug functionality on the first scan chain when the predefined condition is satisfied and the one or more control signals from the security processor satisfy the specified criterion.

19. The computer system of claim 10, further comprising:
a secure memory to store the diagnostic code;
wherein the secure memory downloads the diagnostic code based at least in part on a determination that a system-level debug enable signal is asserted; and
wherein the security processor acquires the diagnostic code from the secure memory.

* * * * *